US006837587B1

(12) United States Patent
Hughes

(10) Patent No.: US 6,837,587 B1
(45) Date of Patent: Jan. 4, 2005

(54) LOW COST FAST STEERING MIRROR

(75) Inventor: John G. Hughes, Casselberry, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 46 days.

(21) Appl. No.: 10/372,454

(22) Filed: Feb. 21, 2003

(51) Int. Cl.$^7$ .............................................. G02B 7/182
(52) U.S. Cl. ...................................... 359/877; 359/876
(58) Field of Search ................................ 359/877, 876, 359/212, 225, 298; 369/32, 44, 112, 116, 284; 360/78.02, 48

(56) References Cited

U.S. PATENT DOCUMENTS

| | | | | |
|---|---|---|---|---|
| 4,157,861 A | * | 6/1979 | Davies | 359/225 |
| 4,410,968 A | * | 10/1983 | Frohbach et al. | 369/44.39 |
| 4,810,079 A | * | 3/1989 | Hartlage | 359/876 |
| 5,550,669 A | | 8/1996 | Patel | |
| 5,852,595 A | * | 12/1998 | Matsui | 369/116 |
| 5,917,647 A | * | 6/1999 | Yoon | 359/298 |
| 6,256,134 B1 | * | 7/2001 | Dhuler et al. | 359/212 |
| 6,549,363 B2 | * | 4/2003 | Leonhardt et al. | 360/78.02 |

* cited by examiner

Primary Examiner—Mohammad Sikder
(74) Attorney, Agent, or Firm—Jeffrey D. Myers; Peacock Myers & Adams PC

(57) ABSTRACT

A fast steering mirror method and apparatus comprising employing a plurality of linear actuators and a plurality of springs. Four actuators and four springs may be employed, with one at each corner of the mirror. If only two amplifiers are employed, the linear actuators are then cross coupled. Control means supplies current to the plurality of linear actuators, preferably with each actuator providing force proportional to current supplied, each comprising a motor and one or more current loops around the motor, with the control means causing displacement of the spring paired with a corresponding linear actuator by a distance approximately proportional to current supplied to the corresponding linear actuator and with the control means causing rotation of the mirror by an angle approximately equal to the displacement of the spring divided by the moment arm from the center line of the mirror to the center of the corresponding linear actuator.

22 Claims, 1 Drawing Sheet

LOW COST FAST STEERING MIRROR

BACKGROUND OF THE INVENTION

1. Field of the Invention (Technical Field)

The present invention relates to fast steering mirror for visible and infrared optical systems.

2. Background Art

In certain optical applications, stabilization of the Line of Sight ("LOS") is critical. This particularly includes applications in optical systems housed in vehicles rather than being stationary. Significant cost savings are realized as expensive feedbacks and control electronics are eliminated while micro stepping for scan interlace and stabilization functions are preserved. Illustrative of the prior art is U.S. Pat. No. 5,550,669, to Patel, entitled "Flexure Design for a Fast Steering Scanning Mirror", issued Aug. 27, 1996.

SUMMARY OF THE INVENTION

Disclosure of the Invention

The present invention is of a fast steering mirror method and apparatus comprising employing a plurality of linear actuators and a plurality of springs. In the preferred embodiment, there are four actuators, four current amplifiers and four springs, with preferably one at each corner of the mirror. If only two current amplifiers are employed, then the linear actuators are cross coupled as diagonal pairs. Control means supplies current to the plurality of linear actuators, preferably with each actuator providing force proportional to current supplied, each comprising a motor with a current loop around the motor, with the control means causing displacement of the spring paired with a corresponding linear actuator by a distance approximately proportional to current supplied to the corresponding linear actuator and with the control means causing rotation of the mirror by an angle approximately equal to the displacement of the spring divided by the moment arm from the center line of the mirror to the center of the corresponding linear actuator.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

Best Modes For Carrying Out The Invention

The present invention is of a Fast Steering Mirror ("FSM") apparatus and method that can be used to augment stabilization of the LOS in visible and infrared ("IR") systems. It is an open loop device that takes advantage of the fact that over limited ranges of travel, springs are displaced proportionally to the force applied to them. The invention is particularly suited to staring arrays.

Figure 1:
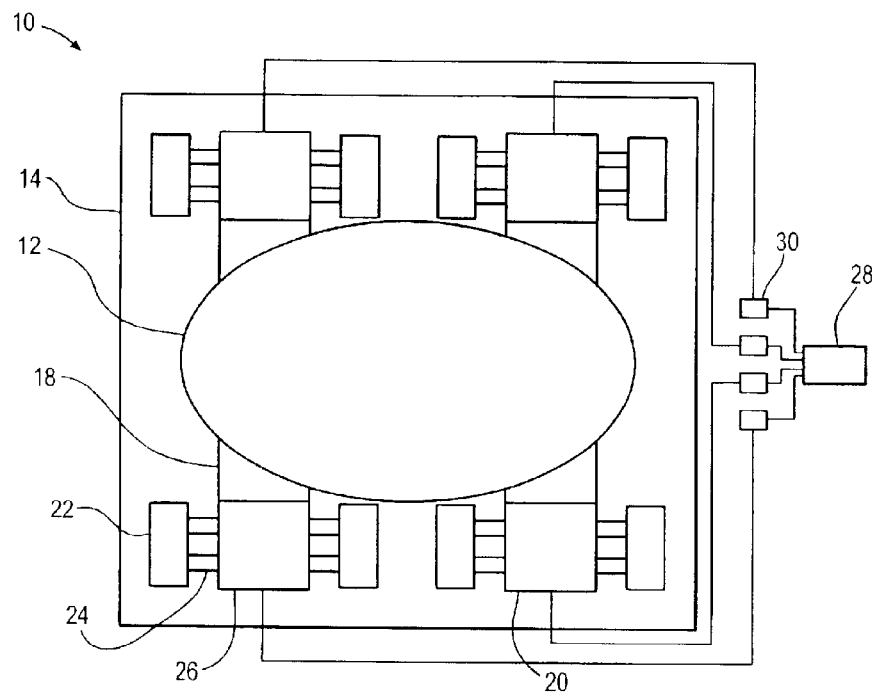
FIG. 1 is a schematic top view of a fast steering mirror according to the invention.
Figure 2:
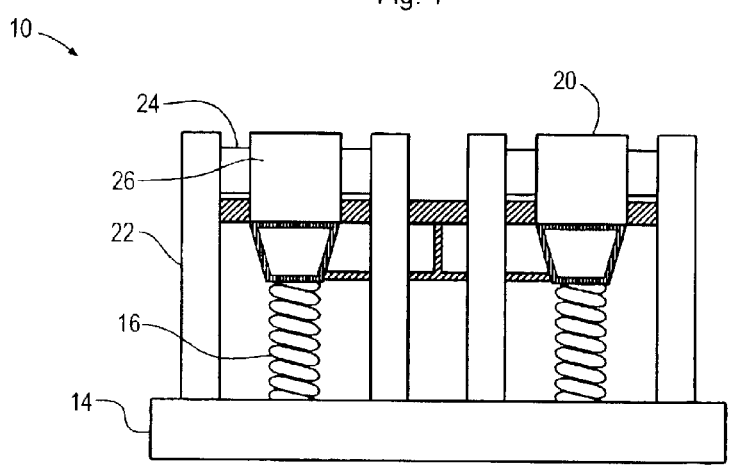
FIG. 2 is a schematic side view of a fast steering mirror according to the invention.

The preferred embodiment comprises a mirror, a plurality of springs (preferably four), a base, a plurality of linear actuators (preferably four), and a plurality of current mode servo amplifiers (preferably two). FIGS. 1 and 2 show such an embodiment 10, comprising mirror 12, base 14, springs 16, magnet supports 18, and motor assemblies (linear actuators) 20, each comprising coil supports 22, coils 24, and magnet assembly 26. The linear actuators can be controlled, as is readily understood by one of ordinary skill in the art, by any existing or future control means 28, whether hardware, firmware, and/or software, together with current mode servo amplifiers 30.

For purpose of the present specification and claims, a "spring" refers to any device that operates according to Hooke's law, including coil springs, flat flexures, and like devices. Hooke's law is that for small $\Delta x$:

$$F_x = -k(x-x_0) = -k\Delta x,$$

where the empirically determined constant k is known as the force constant of the spring, x is the coordinate of the free end of the spring, $x_0$ is the value of x when the spring is unstretched or compressed from its equilibrium condition, and $F_x$ is$_0$ the force applied on or exerted by the spring.

Four sets of springs, linear actuators and drive amplifiers are preferred. Only two drive amplifiers are required when the motors are driven in a cross coupled fashion. For motors A, B, C, and D as shown below, A-D are driven in series and B-C are driven in series, where plus signifies a direction into the page:

A C
B D (A–D)+(B–C)=left edge of mirror into page;
−(A–D)+(B–C)=bottom edge of mirror into page;
(A–D)−(B–C)=top edge of mirror into page; and
−(A–D)−(B–C)=right edge of mirror into page.

Thus, the mirror is controllable in two axes.

The invention preferably augments LOS stabilization of optical systems in two axes. Current loops are closed around the motors. The force generated by the motors will therefore be proportional to the current command voltage. Over short distances, springs displace in proportion to the force applied to them. Therefore, the springs will displace in proportion to the current command voltage. For small angles, tan $\ominus$ is equal to $\ominus$. For a given force, the spring will displace by $d=F/K_s$, where d is the amount of displacement, F is the force applied and $K_s$ is the spring constant of the spring.

The mirror will rotate $\ominus = d/m$, where $\ominus$ is the angle of rotation, d is the motor displacement and m is the moment arm from the mirror center line to the center of the motor.

Therefore, the mirror can be angularly displaced in two axes in a predictable manner that is proportional to analog current command voltages. Stabilization rate errors are available in most stabilized optical systems. These errors can be integrated, transformed, and scaled to command the present invention to cancel these residual LOS disturbances.

As an example, for a mirror with a 300 Hz mount frequency and dimensions of 2×3 inches, only an approximately 2 milliradian travel is sufficient for suitable operation of the invention.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A fast steering mirror apparatus comprising:
   a mirror;
   a plurality of linear actuators;
   a plurality of springs;
   a plurality of current mode servo amplifiers; and
   control means supplying current to said plurality of linear actuators via said plurality of current mode servo amplifiers.

2. The apparatus of claim 1 wherein said plurality of linear actuators and springs each number four.

3. The apparatus of claim 2 wherein one of said linear actuators is at each corner of said mirror.

4. The apparatus of claim 2 wherein said linear actuators are cross coupled.

5. The apparatus of claim 1 wherein said plurality of linear actuators provide force proportional to current supplied.

6. The apparatus of claim 5 wherein said plurality of linear actuators each comprise a motor and a current loops around said motor.

7. The apparatus of claim 5 wherein said control means causes displacement of the spring paired with a corresponding linear actuator of said plurality of linear actuators by a distance approximately proportional to current supplied to said corresponding linear actuator.

8. The apparatus of claim 7 wherein said control means causes rotation of said mirror by an angle approximately equal to said displacement of said spring divided by a moment arm from a center line of said mirror to a center of said corresponding linear actuator.

9. A method of steering a fast steering mirror, the method comprising the steps of:
   engaging the mirror with a plurality of linear actuators;
   engaging the mirror with a plurality of springs;
   employing a plurality of current mode servo amplifiers; and
   supplying current to the plurality of linear actuators via control means and the plurality of current mode servo amplifiers.

10. The method of claim 9 wherein the plurality of linear actuators and springs each number four.

11. The method of claim 10 wherein one of the linear actuators is at each corner of the mirror.

12. The method of claim 10 wherein the linear actuators are cross coupled.

13. The method of claim 9 wherein the plurality of linear actuators provide force proportional to current supplied.

14. The method of claim 13 wherein the plurality of linear actuators each comprise a motor and one current loop around the motor.

15. The method of claim 13 wherein the control means causes displacement of the spring paired with a corresponding linear actuator of the plurality of linear actuators by a distance approximately proportional to current supplied to the corresponding linear actuator.

16. The method of claim 15 wherein the control means causes rotation of the mirror by an angle approximately equal to the displacement of the spring divided by a moment arm from a center line of the mirror to a center of the corresponding linear actuator.

17. A fast steering mirror apparatus comprising:
   a mirror;
   a plurality of linear actuators each comprising a motor and a current loops around said motor;
   a plurality of springs; and
   control means supplying current to said plurality of linear actuators; and
   wherein said plurality of linear actuators provide force proportional to current supplied.

18. A fast steering mirror apparatus comprising:
   a mirror,
   a plurality of linear actuators;
   a plurality of springs; and
   control means supplying current to said plurality of linear actuators; and
   wherein said plurality of linear actuators provide force proportional to current supplied; and
   wherein said control means causes displacement of the spring paired with a corresponding linear actuator of said plurality of linear actuators by a distance approximately proportional to current supplied to said corresponding linear actuator.

19. The apparatus of claim 18 wherein said control means causes rotation of said mirror by an angle approximately equal to said displacement of said spring divided by a moment arm from a center line of said mirror to a center of said corresponding linear actuator.

20. A method of steering a fast steering mirror, the method comprising the steps of:
   engaging the mirror with a plurality of linear actuators each comprising a motor and one current loop around the motor;
   engaging the mirror with a plurality of springs; and
   supplying current to the plurality of linear actuators via control means; and
   wherein the plurality of linear actuators provide force proportional to current supplied.

21. A method of steering a fast steering mirror, the method comprising the steps of:
   engaging the mirror with a plurality of linear actuators;
   engaging the mirror with a plurality of springs; and
   supplying current to the plurality of linear actuators via control means; and
   wherein the plurality of linear actuators provide force proportional to current supplied; and
   wherein the control means causes displacement of the spring paired with a corresponding linear actuator of the plurality of linear actuators by a distance approximately proportional to current supplied to the corresponding linear actuator.

22. The method of claim 21 wherein the control means causes rotation of the mirror by an angle approximately equal to the displacement of the spring divided by a moment arm from a center line of the mirror to a center of the corresponding linear actuator.

* * * * *